United States Patent [19]

Mourray

[11] 4,298,193
[45] Nov. 3, 1981

[54] UPPER MOUNTING UNIT FOR MACPHERSON STRUT ASSEMBLY

[75] Inventor: Jack W. Mourray, West Bloomfield, Mich.

[73] Assignee: Ford Motor Company, Dearborn, Mich.

[21] Appl. No.: 83,483

[22] Filed: Oct. 10, 1979

[51] Int. Cl.³ ............................................. B60G 11/38
[52] U.S. Cl. ................................... 267/63 R; 280/668
[58] Field of Search ............... 188/322; 267/35, 63 A, 267/63 R, 64 A, 64 B, 153; 280/668

[56] References Cited

U.S. PATENT DOCUMENTS

| | | |
|---|---|---|
| 3,159,391 | 12/1964 | Wilfert et al. ................... 267/63 R |
| 3,279,782 | 10/1966 | Schick . |
| 3,346,272 | 10/1967 | Smith . |
| 3,434,708 | 3/1969 | Hawk . |
| 3,446,318 | 5/1969 | Duckett . |
| 3,482,829 | 12/1969 | Kidby . |
| 3,573,880 | 4/1971 | Sakai . |
| 3,589,701 | 6/1971 | Gee . |
| 3,941,401 | 3/1976 | Allison . |
| 4,042,259 | 8/1977 | Fiedler et al. . |
| 4,105,222 | 8/1978 | Buchwald . |
| 4,143,729 | 3/1979 | West et al. . |

Primary Examiner—Duane A. Reger
Attorney, Agent, or Firm—Steven L. Permut; Clifford L. Sadler

[57] ABSTRACT

An upper mount for a MacPherson strut assembly having a mounting plate with an upper and lower elastomeric pad mounted thereto with retaining plates clamping the two pads and having two outer elastomeric isolators above and below the two retaining plates and having a third and fourth retaining plate clamping the outer two elastomeric pads to provide an isolating upper mount which isolates rebound vibrations, jounce vibrations and side load vibrations.

17 Claims, 3 Drawing Figures

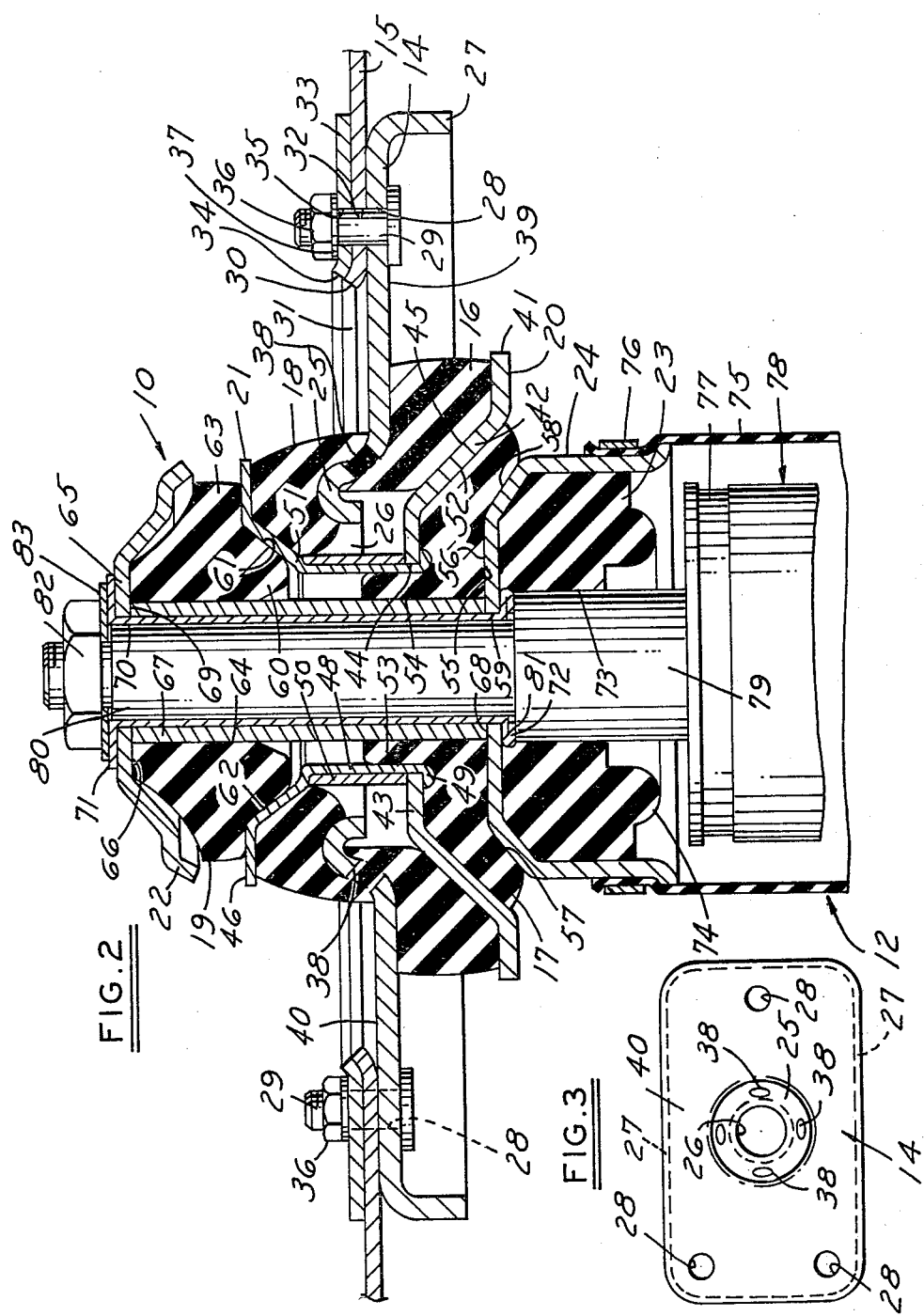

UPPER MOUNTING UNIT FOR MACPHERSON STRUT ASSEMBLY

BACKGROUND OF THE INVENTION

1. Field of the Invention.

This invention relates a MacPherson strut upper mounts.

2. Description of the Prior Art

MacPherson strut suspensions offer a great advantage in the fact that a shock absorber doubles as a upper arm which helps in locating the wheel position of the motor vehicle. However, the fact that the shock absorber doubles as a strut consequentially means that the strut must be securly mounted onto the motor vehicle body. Most commonly the top end of the piston rod is mounted to the fender well or other structurally sound part of the body.

Due to the secure mounting of the piston rod to the vehicle body, vibrations from the wheel are transmitted through the MacPherson strut to the vehicle body. To eliminate such undesirable vibrations in the vehicle body it is necessary to mount the top end of the strut to the body simultaneously in a secure manner while isolating any vibrations that may transmit up through the strut. Known upper mounts have used elastomeric isolators to isolate the piston rod from the vehicle body. U.S. Pat. No. 3,279,782 issued to Schick on Oct. 18, 1966 discloses a onion shaped rubber mount which is secured within a casing bolted onto the vehicle body. U.S. Pat. No. 3,482,829 issued to Kidby on Dec. 9, 1969, U.S. Pat. No. 3,589,701 issued to Gee on June 29, 1971 and U.S. Pat. No. 4,105,222 issued to Buchwald on Aug. 8, 1978 disclose annular elastomeric pads mounting the top end of the piston rod to the vehicle body.

It is also known to have a jounce bumper mounted above the MacPherson strut cylinder about the piston rod and below the elastomeric isolator which secures the piston rod to the body. Examples of two such devices are disclosed in U.S. Pat. No. 3,346,272 issued to Smith on Oct. 10, 1967, U.S. Pat. No. 4,042,259 issued to Fiedler et al on Aug. 16, 1977 and U.S. Pat. No. 3,941,401 issued to Allison on Mar. 2, 1976.

In addition, it is also known to isolate vibrations of the MacPherson strut from the vehicle body by the use of an isolator which is situated above and below a vehicle mounting plate. One such device is disclosed in U.S. Pat. No. 3,573,880 issued to Sakai on Apr. 6, 1971.

Due to refinements in the tuned ride of motor vehicles, and the use of MacPherson struts in these motor vehicles, it is desirable to isolate most vibrations transmitted through the MacPherson strut while maintaining the strut as a precise positioning control arm. It is also desirable to have an upper mount which can be easily tuned for a specific model.

SUMMARY OF THE DISCLOSURE

According to the invention, an upper mounting unit for the upper end of a MacPherson strut assembly includes a substantially horizontal mounting plate with a central aperture therethrough which has a first elastomeric isolator abutting its lower side and a second elastomeric isolator below the first elastomeric isolator. In addition, a third elastomeric isolator is positioned above the mounting plate and juxtaposed thereto. The second elastomeric isolator has a compression rate which is different than the first elastomeric isolator.

In one embodiment of the invention, the first and third elastomeric isolator are bonded to the lower and upper surfaces of the mounting plate respectively. A first and second plate retainer abuts the first and third isolators and are fixed in position to preload the first and third isolators in compression. In addition, a fourth isolator is mounted on the upper surface of the second retainer plate.

In one embodiment, a third and fourth retainer plate are situated below the second isolator and above the fourth isolator respectively and are fixed to preload the second and fourth isolator in compression. In one embodiment, the third retainer plate is shaped to form an upside down cup with an open bottom. A rebound bumper is mounted below the second isolator in the cup which is sized to receive the top end of a MacPherson strut cylinder.

BRIEF DESCRIPTION OF THE DRAWINGS

Reference now will be made to the following drawings in which:

FIG. 2 is a partially segmented side elevational view viewed at right angles from the view shown in FIG. 1 along the lines II—II in FIG. 1. showing the mount mounted to a fender well.

FIG. 3 is a plan view of the mounting plate shown in FIGS. 1 and 2.

DETAILED DESCRIPTION OF THE PREFERRED EMBODIMENT

Figure 1:
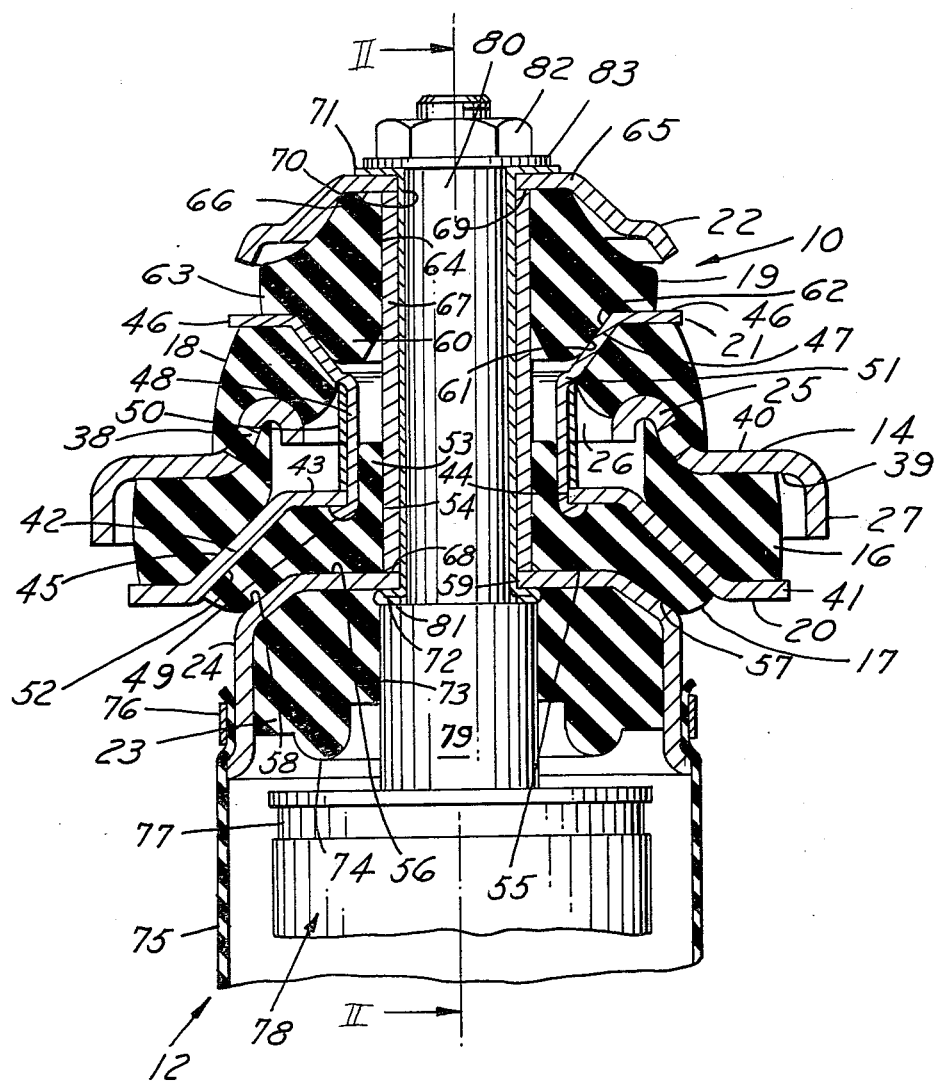
FIG. 1 is a partially segmented side elevational view of one embodiment of the invention.

Referring to FIGS. 1 and 2, in general, an upper mounting unit 10 for a MacPherson strut assembly 12 has a mounting plate 14 bolted onto fender well 15 of the motor vehicle. A series of elastomeric isolators 16, 17, 18 and 19 are stacked on top of one another with retainer plates 20, 21 and 22 sandwiched therewith. An additional elastomeric rebound bumper 23 is fitted within an upside down cup 24 which is mounted below isolator 17.

More specifically, the mounting plate 14 has an upwardly extending double lip flange 25 with a central aperture 26 therethrough. The outer perimeter of the plate 14 has a downwardly depending flange 27. As shown in FIG. 3, the plate 14 has an elongated shape with mounting apertures 28 forming a triangular pattern. The specific shape and placement of mounting apertures 28 can vary depending upon specific package requirements for the specific motor vehicle.

A bolt 29 as shown in FIG. 2 extends through the aperture 28 on the right side of the mounting unit assembly and two similar bolts 29 extend through the two apertures 28 at the left side as shown in FIG. 2. The fender well 15 has a upwardly turned inner flange 30 about an aperture 31. The fender well has three apertures 32 aligned with apertures 28 of the mounting plate 14. In addition a reinforcing ring 33 has an inner upwardly turned lip 34 and apertures 35 align with apertures 28. A nut 36 is threadably engaging bolt 29 with a washer 37 situated between it and reinforcing ring 33.

The inner periphery of plate 14 about central aperture 26 has a plurality of smaller apertures 38 circumferentially spaced about central aperture 26 angled through the outer perimeter of upwardly extending lip 25. Elastomeric isolator 16 is bonded to the under surface 39 under lip 25 while elastomeric pad 18 is bonded to the upper surface 40 of lip 25 of mounting plate 14. In addition, the apertures 38 are filled with the same elastomeric material to integrally join the elastomeric isolator 16 with elastomeric isolator 18 therethrough.

Retainer plate 20 has an outer horizontal section 41 with an upwardly extending frustoconical section 42 joining it with an upward horizontal inner section 43 which has a central aperture 44 therethrough. The upper surface 45 of retainer plate 20 abuts the lower surface of isolator 16 in both a radial fashion and a vertically extending fashion.

Upper retainer plate 21 has an outer horizontal section 46 and a downwardly extending frusto-conical section 47 which connects the horizontal section 46 with the vertically extending cylindrical section 48 which extends through central aperture 26. Cylindrical section 48 has a lower outwardly turned lip 49 engaging the retainer plate 20 about central aperture 44. In addition, a cylindrical spacer ring 50 is fitted between the shoulder 51 of retainer plate 21 between frustoconical section 47 and cylindrical section 48 and the inner periphery of retainer plate 20 about aperture 44. In this fashion retainer plate 20 is axially fixed with respect to plate 21.

Isolator 17 has an outer periphery which abuts the lower surface 52 of the frustoconical section 42 of retainer plate 20 and has an inner upwardly extending section 53 which fits within the cylindrical section 48 of retainer plate 21. The elastomeric isolator 17 is annular shaped with a central aperture 54 therethrough. The lower surface 55 of elastomeric isolator 17 abuts an upper surface 56 of retainer cup 24. The outer periphery 57 of surface 55 is frustoconical in shape and abuts the corresponding frustoconical section 58 of surface 56. Retainer cup 24 has a central aperture 59.

Elastomeric isolator 19 sits on top retainer plate 21 with an inner protruding annular section 60 having an outer surface 61 which abuts an upper surface 62 of frustoconical section 47 of retainer plate 21. In addition, an outer periphery 63 of isolator 19 abuts the horizontal outer section 46. The elastomeric isolator 19 has a central aperture 64. The upper end 66 of isolator 19 abuts the inner horizontal section 65 of retainer plate 22.

A cylindrical tube 67 fits within the central apertures 54 and 64 of isolators 17 and 19 respectively abutting the inner surfaces of said isolators and having a lower end 68 abutting the surface 56 of retainer cup 24 and having upper end 69 abutting the horizontal section 65 of retainer plate 22. In addition, an inner tube 70 is coaxially mounted with inner tube 67 and has an upper outwardly extending lip 71 which extends over retainer plate 22 and a lower double crimped end 72 extending under the inner edge of cup 24. The two tubes 67 and 70 fix retainer plate 22 with respect to retainer cup 24.

Elastomeric rebound stop pad 23 is sized to fit within retainer cup 24 and has a central aperture 73 therethrough. An annular protruding ring 74 forms a lower most point of rebound pad 23.

The retainer cup 24 has a dust shield 75 clipped thereon by a band 76. The retainer cup 24 is sized to receive the upper end 77 of a cylinder 78 in the MacPherson strut assembly 12.

The central aperture 73 of elastomeric jounce pad 23 is sized to receive an upper portion of a piston rod 79. The inner tube 70 is sized to receive a narrow upper end 80 of piston rod 79. With a shoulder 81 of piston rod 79 abutting the double crimped end 72 of a nut 82 threads onto the upper end 80 of piston rod 79 with a rubber washer 83 isolating it from the upper lip 71 of inner tube 70.

The isolators are resilient and are made from elastomeric material. The elastomeric isolators, 16, 18, 19 and 23 are made from natural rubber while elastomeric isolator 17 is made from a synthetic material such as a epichlorohydrin blend of 20% homopolymer and 80% copolymer. The elastomeric material of each isolator has a durometer reading of approximately 50±3. The assembly is tuned such that upon a 3 mm deflection in jounce, the assembly produces a force of 4,400 Newton to 6,600 Newtons and a 3 mm deflection in rebound produces a force between 1,150 and 1,650 Newtons.

The retaining plates 20, 21, 22, and 24 are fixed such that a precompression is applied to isolators 16, 17, 18, and 19 of approximately 4% with 20 lbs preload force on the mounting unit assembly.

In operation, as the MacPherson strut enters jounce, at an extreme point, the cylinder 78 will abut against jounce pad 23 which will absorb some of the shock. In addition, the mounting assembly is tuned so that an upper force will be exerted against the mounting unit assembly 10 to further compress isolator 16 and in addition, isolator 18 undergoes a decompression by retaining plate 21 being forced upwardly. After a certain amount of force is absorbed by isolator 16 and 18, elastomeric isolator 17 becomes compressed and also elastomeric isolator 19 becomes decompressed.

During rebound an downward directed force is applied to retaining plate 20 which will cause isolator 19 to compress first and isolator 17 to enter decompression. After predetermined compression force is absorbed by isolator 19, elastomeric isolator 18 will enter compression and elastomeric isolator 16 will decompress.

Any sidewardly directed or torque forces on the MacPherson strut assembly will likewise be absorbed by elastomeric isolator rings 16, 17, 18 and 19 through the isolators being loaded in shear.

In this fashion, a MacPherson strut upper mount assembly is constructed which will absorb vibrations in series of steps due to the fact of having stacked elastomeric isolators having different compression rates and shear rates which can be easily tuned by varying the durometer of the material used, shapes of the isolators and shapes of the retainer plates.

Variations and modifications of the above described embodiments are possible without departing from the spirit and scope of the invention as defined by the appended claims.

The embodiments in which an exclusive property or privilege as claimed are defined as follows:

1. A mounting unit for the upper end of a MacPherson strut comprising;
    a substantially horizontal mounting plate with a central aperture therethrough;
    a first elastomeric isolator abutting a lower side of the mounting plate about said aperture and secured to said plate;
    a second elastomeric isolator juxtaposed below said first isolator;
    a third elastomeric isolator abutting an upper side of the mounting plate about said aperture and secured to said mounting plate;
    said second elastomeric isolator having a different compression rate than said first isolator;
    said mounting plate rigidly mountable to a motor vehicle and said isolators aligned such that a passage is formed through said mounting unit to provide an outer end of a piston rod to extend therethrough and be mounted thereto such that upon jounce of a bumper, an upper end of a cylinder of a MacPherson strut becomes juxtaposed with said second isolator to compress one of said first and second isolators and then compress said other of said first and second isolators and upon rebound, a compressive force is applied to said third isolator.

2. A mounting unit defined in claim 1 wherein;
said first second and third elastomeric isolators are each annular elastomeric rings coaxially mounted about a common axis of said passage.

3. A mounting unit as defined in claim 2 wherein;
said first and second isolators are interfitted along a vertical extent and said first isolator is mounted to said mounting plate along a vertical extent such that side load forces and side ways directed vibrations load the first and second isolator in compression.

4. A mounting unit as defined in claim 2 or 3 wherein;
said first and second annular isolators are secured to each other and said first isolator is secured to said mounting plate such that side load forces exerted thereon load the first and second isolators in shear.

5. A mounting unit as defined in claim 4 wherein;
the shear rate of said first isolator is different than the shear rate of said second isolator.

6. A mounting unit as defined in claim 5 further comprising;
a fourth annular elastomeric isolator coaxially mounted above said third annular isolator and juxtaposed therewith;
said fourth isolator having a different compression rate than said third isolator.

7. A mounting unit as defined in claim 6 wherein;
said first isolator is bonded to the lower side of said mounting plate;
a first retainer plate between said first and second isolators has vertically and radially extending opposing surfaces with one surface abutting said first isolator and its opposing surface abutting said second isolator;
said plate has an aperture therethrough aligned with said passage;
said third isolator is bonded to the upper side of said mounting plate;
a second retainer plate between said third and fourth isolators has vertically and radially extending opposing surfaces with one surface abutting said third isolator and its opposing surface abutting said fourth isolator;
said second plate having an aperture therethrough aligned with said passage.

8. An upper mount as defined in claim 7 wherein;
said first and second retainer plates are positioned to preload said first and third isolators in shear and compression.

9. An upper mount as defined in claim 8 wherein;
said first and second retainer plates are secured a fixed distance from each other such that as said first retainer plate moves closer to said mounting plate and loads said first isolator further in compression, said second retainer plate is moved away from said mounting plate and said second isolator is decompressed and vice versa.

10. An upper mount as defined in claim 7 wherein;
said mounting plate has a plurality of smaller apertures circumferentially spaced about its central aperture;
said first and third elastomeric isolators extend into said smaller apertures and are joined together through said smaller apertures.

11. An upper mount as defined in claim 8 further comprising;
a third retainer plate abutting the lower side of said second isolator;
a fourth retainer plate abutting the upper side of said fourth isolator;
said third and fourth retainer plates clamped together to preload said isolators in shear and compression;
said third and fourth plates each having an aperture aligned with said passage.

12. An upper mount as defined in claim 11 wherein;
said third and fourth retainer plates are secured a fixed distance from each other such that as said third plate moves closer to said second plate and loads said fourth isolator further in compression, said third plate moves away from said first plate and said second isolator is decompressed and vice versa.

13. An upper mount as defined in claim 11 wherein;
said fourth retainer plate has downwardly depending flanges to form a cup sized to receive a top end of a cylinder of a McPherson strut;
a fifth annular elastomeric isolator, with a defined aperture aligned with said passage, positioned in said cup;
said fifth isolator having a lower compression rate than said other isolators.

14. A mounting unit as defined in claim 2 or 3 further comprising;
a fourth annular elastomeric isolator coaxially mounted above said third annular isolator and juxtaposed therewith;
said fourth isolator having a different compression rate than said third isolator.

15. A mounting unit as defined in claim 4 wherein;
said mounting plate has a vertically extending curved lip about said central aperture therethrough;
said lip having one side bonded to said first annular isolator and a second side bonded to said third annular isolator.

16. An upper mount as defined in claim 15 wherein;
said mounting plate has a plurality of smaller apertures circumferentially spaced about its central aperture;
said first and third elastomeric isolators extend into said smaller apertures and are joined together through said smaller apertures.

17. A mounting unit as defined in claim 15 further comprising;
a first retainer plate between said first and second isolators having a frusto-conical vertically extending section with opposing surfaces abutting said first and second isolator respectively;
a second retainer plate on top of said third elastomeric isolator having a frusto-conical vertically extending section with a lower surface of said section abutting said third isolator;
said first and second retainer plates fixed to each other and positioned such that a preload in compression is exerted upon the first and third elastomeric isolators.

* * * * *